July 16, 1935.  C. A. MATSON  2,008,140
AUTOMATIC REVERSE BRAKE
Filed Nov. 25, 1932  3 Sheets-Sheet 1
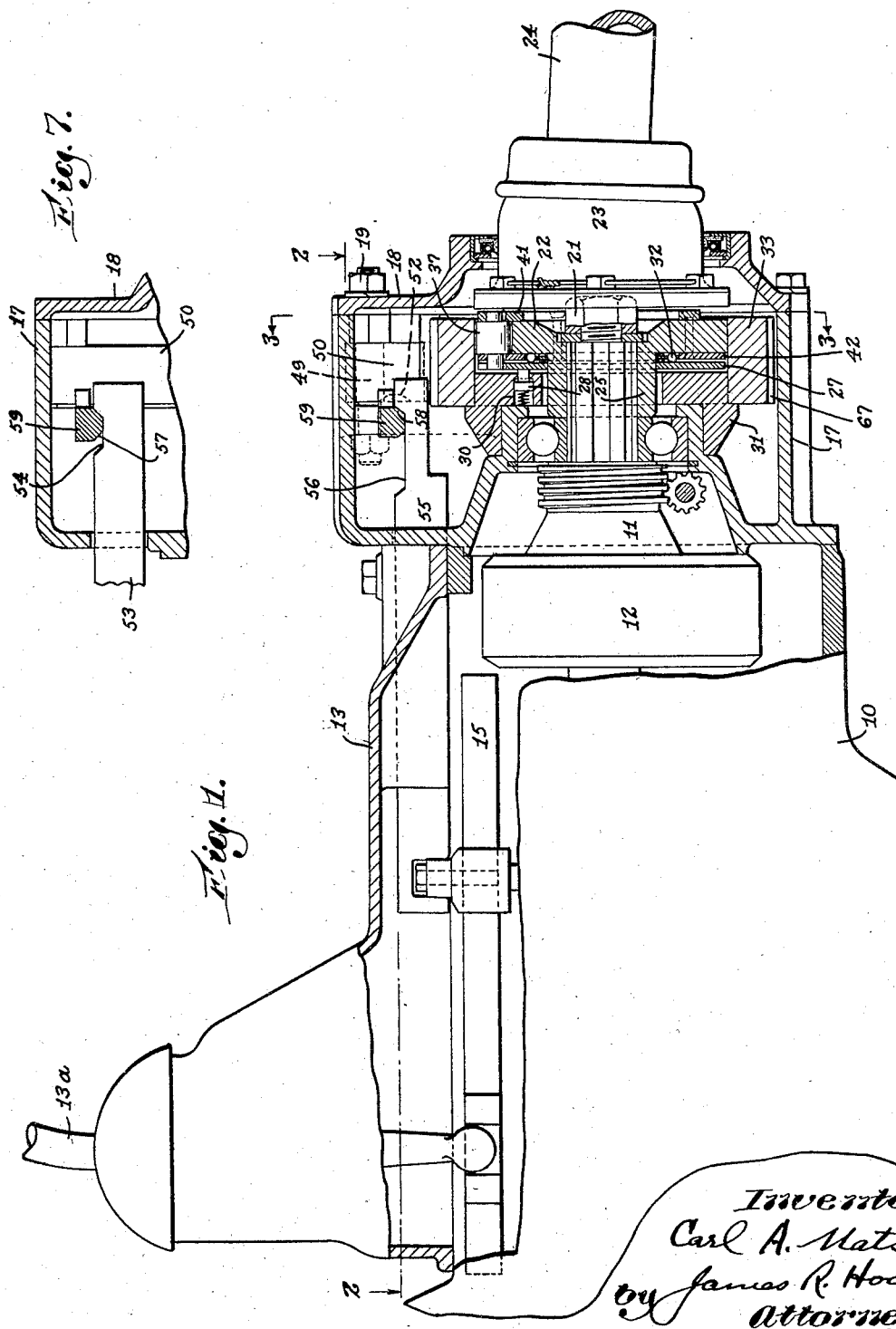
Inventor
Carl A. Matson
by James R. Hodder
Attorney

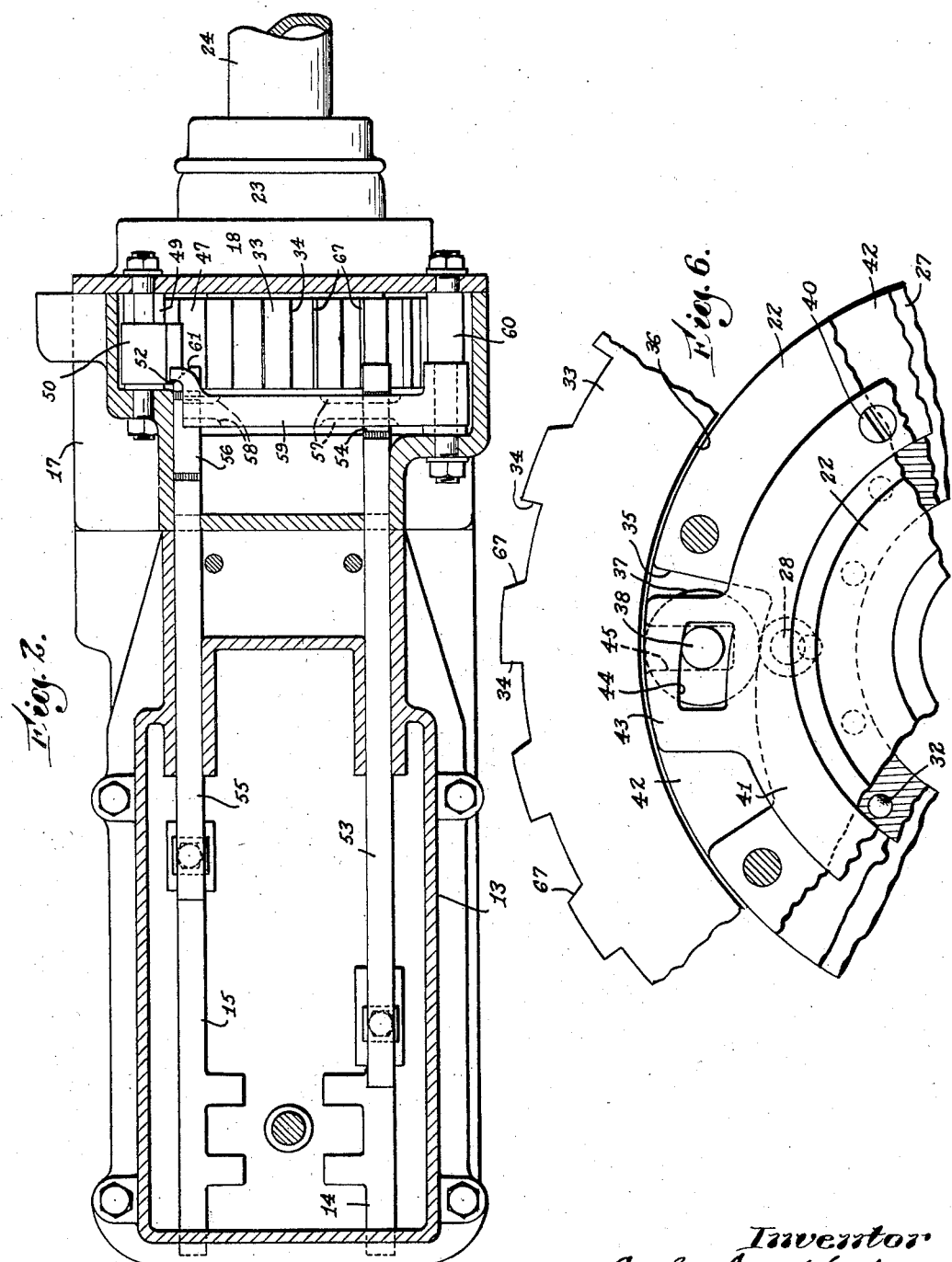

July 16, 1935.  C. A. MATSON  2,008,140
AUTOMATIC REVERSE BRAKE
Filed Nov. 25, 1932   3 Sheets-Sheet 3
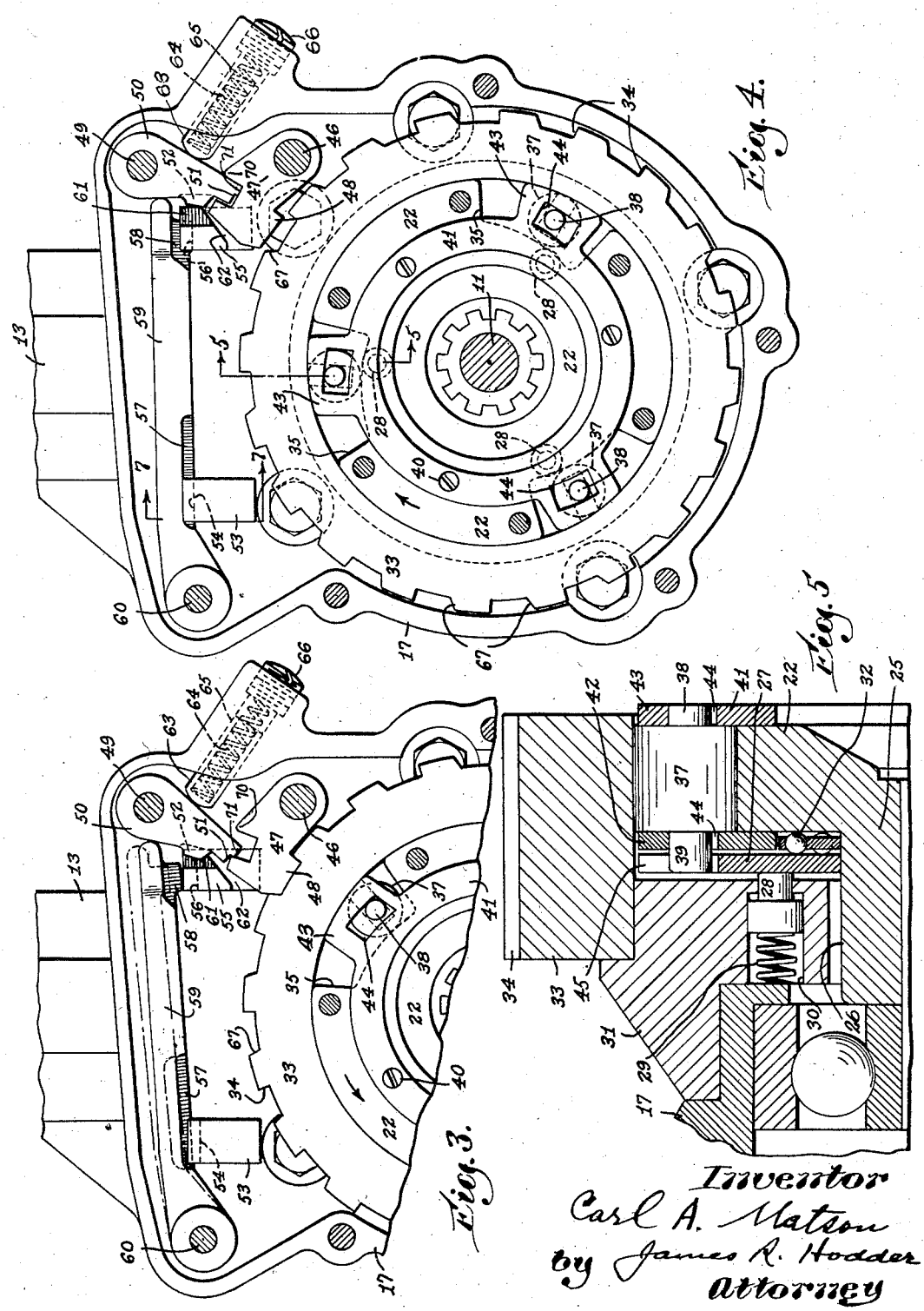

Patented July 16, 1935

2,008,140

UNITED STATES PATENT OFFICE 2,008,140

AUTOMATIC REVERSE BRAKE

Carl A. Matson, Lynnfield, Mass., assignor to The Matson Company, Concord, N. H., a corporation of New Hampshire Application November 25, 1932, Serial No. 644,169

9 Claims. (Cl. 192—4)

My present invention relates to a brake mechanism, and more particularly to a novel and improved automatic reverse brake for automobiles or other mechanical devices.

I have heretofore devised several distinct mechanisms for accomplishing the highly desirable purpose of preventing inadvertent reverse movement of a motor vehicle, particularly on inclines, and the device of this application pertains to this same class or type of mechanisms.

Another object of the present invention resides in the fact that my present device is highly efficient in operation, being positive in use, rugged, durable and long lived, while yet possessing the advantages of simplicity and economy.

Another feature of the present invention resides in the fact that a machine equipped with my device may be moved in a rearward direction, either under its own power or by hand, by placing the normally operative brake mechanism in an inoperative condition or position, this being accomplished by simply moving the gear shift lever to reverse position and thence to neutral position.

Another and important feature of the present invention resides in the fact that the locking elements, preferably rollers, are held out of idling engagement during the forward movement of the device.

The importance of this latter-mentioned feature will be instantly apparent to and understood by those skilled in this art, as the elimination of idling of the locking elements during movement of the device in a forward direction results in the total elimination of the major portion of the friction and wear which would otherwise be imposed upon these locking elements or devices.

I accomplish this last mentioned and valuable feature by the provision of a novel member which I have herein termed a drag ring, associated with the locking elements which in this instance are illustrated as rollers, and which drag ring is so constructed and arranged as to move said rollers, on movement of the vehicle in a forward direction, to the large end of the wedge chambers, thus removing them from contact with the fixed part of the device and preventing their idling during said forward movement, thus eliminating chattering, friction and wear, and greatly increasing the efficiency, positiveness and life of my novel device.

A further feature of the present invention resides in the provision of a novel member which I have herein termed a ratchet ring, and its associated parts, as the fixed part of my novel reverse brake mechanism. This ratchet ring is normally restrained from rotation by means of a novel pawl and latch mechanism which will, of course, be hereinafter more fully described.

As a further novel feature of my invention, I mount this ratchet ring upon a member fixed to a rigid part of the casing or housing of my device, thus still further eliminating wear which would ordinarily occur, and also reducing likelihood of unwanted rotation being imparted to said ring.

Another object of my invention resides in the construction and arrangement of the locking roller carrying means.

Other objects and features of the invention reside in the particular construction and arrangement of the device and parts thereof, and all of the foregoing, together with other objects and features of the invention, will be hereinafter more fully pointed out, described and claimed.

Referring to the drawings illustrating a preferred embodiment of the present invention, Fig. 1 is a side elevation of an automobile transmission mechanism, partly in section, illustrating my invention applied thereto;

Fig. 2 is a plan sectional view on the line 2—2 of Fig. 1;

Fig. 3 is a fragmentary vertical sectional view on the line 3—3 of Fig. 1, with the device in the position assumed during forward speed;

Fig. 4 is a vertical sectional view on the line 3—3 of Fig. 1, with the locking rollers in braking position;

Fig. 5 is a fragmentary vertical sectional view, on an enlarged scale, on the line 5—5 of Fig. 4;

Fig. 6 is a fragmentary vertical sectional view similar to a part of Fig. 3, but on an enlarged scale; and Fig. 7 is a fragmentary vertical sectional view on the line 7—7 of Fig. 4.

Referring now to the drawings, for a particular description of the invention, its construction, assembly and operation, 10 designates a transmission casing provided with the usual transmission gearing and having rotatably mounted therein and extending through the rear end thereof a transmission shaft 11. Associated with said transmission shaft is a free wheeling unit illustrated generally at 12. Mounted on the top of the transmission casing 10 is a cover 13, in which is pivotally mounted the gear shift lever 13a for operating the slide rods 14 and 15 associated with the speed change gearing within the casing 10. Because of the presence of the free wheeling unit 12, it is necessary to equip said slide rods with extensions, in a manner and for a purpose to be hereinafter described in detail. Attached to the rear of the transmission casing 10 is a casing 17 open at the rear end and provided with a cover 18 that is secured in position by bolts 19.

Secured to the splined end of the transmission shaft 11 by a nut 21 is one member 22 of the usual knuckle joint, the other member 23 being connected to the propeller shaft 24. The hub 25 of the member 22 is smoothed off, to provide a seat 26 (see Fig. 5) for a drag ring 27, said ring 27 being under pressure of the plungers 28 forced thereagainst by the springs 29 in the recesses 30 in the member 31, said member being fixed to a part of the casing 17. Interposed between the drag ring 27 and the member 22 is an anti-friction bearing 32, so that the drag of the plungers 28 on the ring 27 will not be affected by any frictional resistance which might otherwise occur on the opposite side of said drag ring.

Surrounding the member 31 and having a substantially close fit thereon, although there is a running clearance therebetween, is a member 33 which I have herein referred to, for simplicity and clarity, as a ratchet ring, because of the fact that this ring is provided, on its periphery, with a plurality of spaced notches 34. Symmetrically arranged about the periphery of the member 22 are recesses 35, said recesses forming, with the bore 36 of the ring 33, substantially wedge-shaped or tapered chambers, in each of which is rotatably mounted a roller 37.

From an inspection of Fig. 1, it will be noted that while the ratchet ring 33 is mounted on the member 31, said ring projects outwardly from said member 22 and surrounds the member 22, but is spaced slightly therefrom, as clearly illustrated in enlarged detail in Fig. 6, so that the rotation of the member 22 will have no wearing effect on the bore of the ring 33 or on the periphery of the said member 22.

As will be noted from an inspection of Fig. 5, each roller 37 is provided with a short projecting stud 38, on one side, and with a longer projecting stud 39 on the opposite side. United to the member 22 by screws 40, and on each side thereof, are rings 41 and 42, the ring 41 having extensions 43 in each of which is an inclined, slightly arcuate slot 44, the ring 42 being provided with corresponding slots 44. The drag ring 27 is provided with radial recesses or slots 45, corresponding in number to the rollers 37. The short studs 38 are located in the slots 44 in the ring 41, and the long studs 39 project through the slots 44 in the ring 42 and into the radial slots or recesses 45 in the drag ring 27.

Pivoted at 46 is a lever 47 having thereon a pawl 48 and located above the pivot 46 is a second pivot 49 on which is mounted a lever 50 having a latch 51, and also being provided with a cam surface 52.

The slide rod 14 is provided with an extension 53 which has a short cam groove 54, and the slide rod 15 is provided with an extension 55 which has an elongated cam groove 56, in which rest the cams 57 and 58 respectively on the arm 59, which in turn is pivoted in the casing 17 at 60.

The extension 55 is provided with a cam surface 61 and with a cut-away portion 62, as clearly shown in Fig. 4.

Assuming the device to have been constructed and arranged as above described, with the parts in the position in Fig. 3 and with the transmission shaft 11 and member 22 rotating in a counter-clockwise direction, as illustrated by the arrow in Fig. 3, in order to cause forward movement of the vehicle to which the device is assumed to be attached, such forward movement will be effected independently of the ratchet ring 33, one of the notches 34 of said ring being engaged by the pawl 48, and said pawl in turn being engaged by the latch end 51 of the lever 50, said lever being forced to the position illustrated in Fig. 3 by the plunger 63 controlled by the spring 64 confined in the recess 65 between the plunger 63 and the screw plug 66. Such counter-clockwise movement or rotation of the member 22 will tend to force the rollers 37 to the right, as viewed in Fig. 3, or toward the large end of the wedging chambers 35. This movement of the rollers 37 toward the large end of the chambers 35 is assisted by the drag ring 27, the elongated studs 39 riding in the recesses 45 thereof and free rotation of said drag ring being resisted by the spring-pressed plungers 28. The movement of the rollers 37 to the right, viewing Fig. 3, will cause the studs 38 and 39 to ride in the slots 44, thus positively moving said rollers 37 out of contact with the ratchet ring 33, thus entirely eliminating idling contact of the rollers 37 with the bore 36 of said ratchet ring during forward movement of the device.

This elimination of idling contact or engagement on the part of the rollers 37 removes the greatest factor of wear therefrom, thus increasing and prolonging the life of the mechanism to a material degree.

Now assume that with the device in the position illustrated in Fig. 3, the machine in which it is incorporated is stopped on an incline. Immediately upon stopping, there would tend to be a retrograde movement of the vehicle, turning the shaft 11 and member 22 in a clockwise direction as indicated by the arrow in Fig. 4. However, the ratchet ring 33 being held against movement, the drag on the ring 27, together with the clockwise movement of the member 22, will force the rollers 37 toward the small end of their respective chambers and toward the high ends of the slots 44, wedging said rollers between the inner wall of said chambers and the bore 36 of the ring 33, effectually preventing any inadvertent reverse movement of the vehicle.

Now assume that it is desired to move the device in a reverse direction, such as by motion under the vehicle's own power. The gear shift lever 13a is manipulated to reverse position, which movement will cause a movement of the slide rod 15 and its extension 55 to the rear, and an engagement of the cam face 61 of said extension with the cam face 52 of the lever 50, moving said lever about its pivot 49 in a counter-clockwise movement, against the tension of the spring-pressed plunger 63, which movement will free the latch 51 from the lever 47. Thereupon, movement of the shaft 11 and member 22 in a clockwise direction, as indicated by the arrow in Fig. 4, will also tend to move the ring 33, and when this movement occurs, the cam face 67 of the particular notch 34 in engagement with the pawl 48 will force said pawl out of said notch, to the position illustrated in Fig. 4.

This will permit reverse movement of the device, as will be readily understood and appreciated. Upon such movement taking place, when the pawl 48 is displaced from its notch 34, the outer end of the arm 59 will drop into the cam grooves 54 and 56, to normal position, and be engaged by the lever 50, as illustrated in Fig. 4, holding the pawl 48 out of engagement with the ring 33. Thus, when the gear shift lever 13a is moved from reverse position to neutral, the device will remain in the position illustrated in Fig. 2. The elongated slot 56 permits movement of the slide rod 15 and its extension 55 to the rear without effecting any vertical movement of the arm 59, as will be appreciated. It should be noted that with the arm lever 59 lifted and held in raised position, the spring 64 will force a notch 51 against the pawl 48 to lock said pawl against the camming action of the surfaces 67 on the ring 33.

Now assume that the device is in neutral, as illustrated in Fig. 1, and that it is desired to move to a forward speed. On movement of the gear shift lever 13a into first or low gear, the slide rod 15 and its extension 55 will be moved forwardly, and the arm 59 will be engaged by the rearmost wall of the elongated cam groove 56, raising the arm 59 to the position illustrated in full lines in Fig. 3. This permits the plunger 63 to force the lever 50 in a clockwise rotative movement, the pawl 48 falling to a position against the outer periphery of the ring 33. If at this instant, the pawl 48 is in register with one of the notches 34, it will engage said notch and the latch 51 will engage said pawl to hold the same therein. If, however, the pawl 48 is not in register with a notch 34, upon the slightest retrograde movement of the vehicle, the ring 33 will be rotated in a clockwise direction, and as soon as the next succeeding notch registers with the pawl 48, engagement thereof will take place and further retrograde movement be restrained.

Upon movement of the gear shift lever 13a from low or first gear to either of the other forward speeds, the arm 59 will be raised out of the cam groove 54, regardless of the direction of movement of the slide rod 14 and its extension 53, to the position illustrated in dotted lines in Fig. 3, without affecting the relation of the pawl 48 and ratchet ring 33. Thus the device, in any of the forward speeds, is constantly in operative position, it being necessary to move the gear shift lever 13a to reverse position in order to render the braking device inoperative.

It will be appreciated that when the gear shift lever 13a is being moved from the neutral position, with the device in the position illustrated in Fig. 4, the initiation of movement toward a forward speed will place the device in operative position, without any material time interval being required to effect this result.

In order to eliminate the necessity of first moving the gear shift lever into or toward reverse position, and then returning the same to neutral before the vehicle can be moved forwardly or backwardly, as, for example, on the floor of a garage, I provide, on the lever 47, a lug 70 in register with a lug 71 on the lever 50. Thus, when the rod 15 is moved rearwardly, as will be the case when the gear shift lever 13 is moved toward reverse position, the cam face 61 of its extension 55, engaging the cam face 52 on the lever 50, will swing said lever 50 about its pivot 49, bringing the lug 71 into engagement with the lug 70 and rocking the lever 47 about its pivot 46 until the latch 48 is raised from its cooperating notch 34 in the ratchet ring 33. This movement, of course, will be against the pressure of the spring pressed plunger 63, and as the lever 50 is rocked in a counter-clockwise direction, the arm 59 will drop to its normal position, as clearly illustrated in Fig. 4.

Thereupon, whether the gear shift rod 15 is retained in the position illustrated in Fig. 4, or whether it is returned to neutral position, the latch 48 will be held out of engagement with the ratchet ring 33 by means of the lever 59 bearing against the outer side of the extension 55. It will thus be appreciated that the lugs 70 and 71 afford means to positively disengage the locking elements comprising the latch 48 and the notches 34, rather than relying upon the camming actions of the cam faces 67 on reverse rotation of the ring 33, a feature that will be instantly apparent to and understood by those skilled in this art.

This feature also eliminates difficulties which might possibly arise when relying upon the camming action to disengage the latch 48. For example, if the gears should not be exactly in register, it would frequently be difficult to effect rearward movement of the vehicle in order to exert such camming action. The novel feature just above described, however, entirely obviates and eliminates this difficulty.

Furthermore, under some circumstances, such, for example, as when a vehicle is rolling rearwardly, and the operator moves the gear shift lever 13a to one of the forward speeds during such rearward movement, damage, injury, and considerable shock are likely to be caused by the instantaneous meshing or engagement of the latch 48 with one of the notches 34 as the ring 33 is rotating in its reverse direction. This is obviated however, by mounting the ratchet ring 33 on a solid member attached to the casing, as aforesaid.

As above explained, the said latch 48 will remain in the notch engaged thereby until the gear shift lever 13a is again moved toward reverse position.

It will thus be appreciated that I have devised a simple, positive, serviceable, and efficient, automatically operable reverse brake mechanism, and since I believe that the same is novel, I have therefore claimed said device broadly in this application.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In a device of the kind described, the combination of a driven member, means for applying power thereto to rotate the same in either direction, a locking element carried by said driven member, a ratchet ring surrounding said driven member and cooperating with said locking element to prevent rotation of the driven member in a reverse direction, means including a drag ring in constant engagement with said locking element to hold said locking element out of engagement with the ratchet ring on rotation of the driven member in a forward direction, and spring controlled means to normally prevent rotative movement of said ratchet ring.

2. In a device of the kind described, the combination with a transmission gearing, including a transmission shaft, of a driven member carried by said shaft, a locking element carried by said driven member, a ratchet ring surrounding said driven member and cooperating with said locking element to prevent rotation of the driven member in a reverse direction, means including a resiliently controlled drag ring in constant engagement with said locking element to hold said locking element out of engagement with the ratchet ring on rotation of the driven member in a forward direction, a pawl normally engaging said ratchet ring to prevent rotative movement of said ratchet ring, and spring controlled means to hold said pawl in locking position.

3. In a device of the kind described, the combination of a driven member, means for applying power thereto to rotate the same in either direction, said driven member having a wedge-shaped recess therein, a member fixed to said driven member at each side thereof and having inclined guiding slots therein adjacent to said recess, a locking roller located in said recess, studs on said roller riding in said slots, a ratchet ring surrounding said driven member and cooperating with said locking roller to prevent rotation of the driven member in a reverse direction, and a resiliently controlled drag ring to hold said locking roller out of engagement with the ratchet ring on rotation of the driven member in a forward direction.

4. In a device of the kind described, the combination of a driven member, means for applying power thereto to rotate the same in either direction, said driven member having a wedge-shaped recess therein, a member fixed to said driven member at each side thereof and having inclined arcuate guiding slots therein adjacent to said recess, a locking roller located in said recess, studs on said roller riding in said slots, a ratchet ring surrounding said driven member and cooperating with said locking roller to prevent rotation of the driven member in a reverse direction, and a resiliently controlled drag ring to hold said locking roller out of engagement with the ratchet ring on rotation of the driven member in a forward direction.

5. In a device of the kind described, the combination of a driven member, means for applying power thereto to rotate the same in either direction, said driven member having a wedge-shaped recess therein, a member fixed to said driven member at each side thereof and having inclined guiding slots therein adjacent to said recess, a locking roller located in said recess, studs on said rollers riding in said slots, a ratchet ring surrounding said driven member and cooperating with said locking roller to prevent rotation of the driven member in a reverse direction, and a resiliently controlled drag ring having a radial slot therein engaged by one of the studs on said roller to hold said locking roller out of engagement with said ratchet ring on rotation of the driven member in a forward direction.

6. In a device of the kind described, the combination of a driven member, means for applying power thereto to rotate the same in either direction, said driven member having a wedge-shaped recess therein, a member fixed to said driven member at each side thereof and having inclined guiding slots therein adjacent to said recess, a locking roller located in said recess, studs on said rollers riding in said slots, a ratchet ring surrounding said driven member and cooperating with said locking roller to prevent rotation of the driven member in a reverse direction, and a resiliently controlled drag ring having a radial slot therein engaged by one of the studs on said roller to hold said locking roller out of engagement with said ratchet ring on rotation of the driven member in a forward direction, said drag ring being spaced from said driven member and free from the direct rotating influence thereof.

7. In a device of the kind described, the combination of a driven member, means for applying power thereto to rotate the same in either direction, said driven member having a wedge-shaped recess therein, a member fixed to said driven member at each side thereof and having inclined guiding slots therein adjacent to said recess, a locking roller located in said recess, studs on said rollers riding in said slots, a fixed abutment adjacent to said driven member, a ratchet ring rotatably mounted on said abutment and projecting over and surrounding said driven member and cooperating with said locking roller to prevent rotation of the driven member in a reverse direction, and a resiliently controlled drag ring having a radial slot therein engaged by one of the studs on said roller to hold said locking roller out of engagement with said ratchet ring on rotation of the driven member in a forward direction, said drag ring being spaced from said driven member and free from the direct rotating influence thereof.

8. In a device of the kind described, the combination of a driven member, means for applying power thereto to rotate the same in either direction, said driven member having a wedge-shaped recess therein, a member fixed to said driven member at each side thereof and having inclined guiding slots therein adjacent to said recess, a locking roller located in said recess, studs on said roller riding in said slots, a fixed abutment adjacent to said driven member, a ratchet ring rotatably mounted on said abutment and projecting over and surrounding said driven member but spaced therefrom and cooperating with said locking roller to prevent rotation of the driven member in a reverse direction, and a resiliently controlled drag ring having a radial slot therein engaged by one of the studs on said roller to hold said locking roller out of engagement with said ratchet ring on rotation of the driven member in a forward direction, said drag ring being spaced from said driven member and free from the direct rotating influence thereof.

9. In a device of the kind described, the combination of a driven member, means for applying power thereto to rotate the same in either direction, said driven member having a wedge-shaped recess therein, a locking roller located in said recess, a ratchet ring surrounding said driven member and cooperating with said locking roller to prevent rotation of the driven member in a reverse direction, said ratchet ring being of greater width than said driven member and mounted independently thereof, and a resiliently controlled drag ring to hold said locking roller out of engagement with the ratchet ring on rotation of the driven member in a forward direction.

CARL A. MATSON.